United States Patent
Ikeda et al.

(10) Patent No.: US 9,755,262 B2
(45) Date of Patent: Sep. 5, 2017

(54) RESIN PANEL STRUCTURE

(71) Applicant: TOYOTA JIDOSHA KABUSHIKI KAISHA, Toyota-shi, Aichi-ken (JP)

(72) Inventors: Koki Ikeda, Toyota (JP); Tomohiro Sakurai, Toyota (JP); Kentaro Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/572,106

(22) Filed: Dec. 16, 2014

(65) Prior Publication Data
US 2015/0180078 A1    Jun. 25, 2015

(30) Foreign Application Priority Data

Dec. 25, 2013    (JP) .................................. 2013-267967

(51) Int. Cl.
 *E04C 1/00* (2006.01)
 *H01M 8/2475* (2016.01)
 *B60L 11/18* (2006.01)

(52) U.S. Cl.
CPC ....... *H01M 8/2475* (2013.01); *B60L 11/1898* (2013.01); *H01M 2250/20* (2013.01); *Y02T 90/32* (2013.01); *Y02T 90/34* (2013.01)

(58) Field of Classification Search
USPC .................................................. 296/191, 29
See application file for complete search history.

(56) References Cited

U.S. PATENT DOCUMENTS

| | | | | |
|---|---|---|---|---|
| 4,898,419 A | * | 2/1990 | Kenmochi et al. | 296/204 |
| 5,150,944 A | * | 9/1992 | Yoshida et al. | 296/203.01 |
| 5,417,453 A | * | 5/1995 | VanDenberg | 280/785 |
| 5,501,289 A | * | 3/1996 | Nishikawa et al. | 180/68.5 |
| 5,534,364 A | * | 7/1996 | Watanabe et al. | 429/61 |
| 5,730,485 A | * | 3/1998 | Sjostedt et al. | 296/181.3 |
| 6,086,143 A | * | 7/2000 | Schroeder | B62D 25/04 |
| | | | | 296/146.11 |
| 6,227,322 B1 | * | 5/2001 | Nishikawa | 180/68.5 |

(Continued)

FOREIGN PATENT DOCUMENTS

| | | |
|---|---|---|
| JP | S63-189788 U | 12/1988 |
| JP | 2013136275 A | 7/2013 |
| JP | A-2013-216250 | 10/2013 |

OTHER PUBLICATIONS

Oct. 27, 2015 Office Action issued in Japanese Application No. 2013-267967.

*Primary Examiner* — Patrick Maestri
(74) *Attorney, Agent, or Firm* — Oliff PLC

(57) ABSTRACT

A resin panel structure capable of improving positioning precision of a resin panel is provided. A resin panel structure includes a fiber reinforced plastic upper panel, a fiber reinforced plastic lower panel disposed below the upper panel, a fiber reinforced plastic core panel that is installed between the upper panel and the lower panel and joined to the upper panel and the lower panel, and includes an opening into which a portion of the upper panel or a portion of the lower panel is inserted, and a joining member that joins the upper panel or the lower panel that is inserted into the opening, and the other of the upper panel or the lower panel, together.

13 Claims, 5 Drawing Sheets

(56) References Cited

U.S. PATENT DOCUMENTS

| | | | | |
|---|---|---|---|---|
| 6,290,021 | B1* | 9/2001 | Strandgaard | B63B 3/68 181/285 |
| 6,291,792 | B1* | 9/2001 | Fussnegger | B23K 11/20 219/118 |
| 6,805,401 | B2* | 10/2004 | Hayashi et al. | 296/204 |
| 6,824,851 | B1* | 11/2004 | Locher et al. | 428/76 |
| 7,088,075 | B2* | 8/2006 | Baba et al. | 320/112 |
| 7,097,238 | B2* | 8/2006 | Fujita | 296/193.07 |
| 7,828,370 | B2* | 11/2010 | Ohi et al. | 296/187.08 |
| 7,905,072 | B2* | 3/2011 | Verhaeghe | B32B 3/06 156/181 |
| 7,997,368 | B2* | 8/2011 | Takasaki et al. | 180/68.5 |
| 8,210,301 | B2* | 7/2012 | Hashimoto et al. | 180/68.5 |
| 8,696,048 | B2* | 4/2014 | Griffin et al. | 296/184.1 |
| 8,936,125 | B2* | 1/2015 | Nakamori | 180/68.5 |
| 2003/0173801 | A1* | 9/2003 | Bohm et al. | 296/191 |
| 2004/0140690 | A1* | 7/2004 | Watanabe | B62D 25/20 296/184.1 |
| 2005/0040675 | A1* | 2/2005 | Fitze | 296/193.07 |
| 2006/0165972 | A1* | 7/2006 | Chimelak et al. | 428/319.1 |
| 2007/0182071 | A1* | 8/2007 | Sekido et al. | 264/511 |
| 2009/0152034 | A1* | 6/2009 | Takasaki et al. | 180/68.5 |
| 2009/0230729 | A1* | 9/2009 | Lusk | 296/193.07 |
| 2010/0102169 | A1* | 4/2010 | Zorzetto et al. | 244/119 |
| 2010/0193108 | A1* | 8/2010 | Aoyama | B29C 65/5042 156/93 |
| 2011/0006562 | A1* | 1/2011 | Campbell et al. | 296/193.04 |
| 2011/0143179 | A1* | 6/2011 | Nakamori | 429/99 |
| 2012/0012239 | A1* | 1/2012 | Fuchs | B23K 11/11 156/60 |
| 2012/0156539 | A1* | 6/2012 | Honjo et al. | 429/100 |
| 2012/0161429 | A1* | 6/2012 | Rawlinson et al. | 280/801.1 |
| 2013/0068548 | A1* | 3/2013 | Akazawa et al. | 180/68.5 |
| 2013/0181476 | A1* | 7/2013 | Naoi | B62D 25/10 296/180.1 |
| 2013/0257105 | A1* | 10/2013 | Mildner et al. | 296/204 |
| 2013/0278019 | A1* | 10/2013 | Preisler et al. | 296/193.07 |
| 2013/0313860 | A1* | 11/2013 | Yamaji et al. | 296/193.07 |
| 2014/0147617 | A1* | 5/2014 | Preisler et al. | 428/99 |
| 2014/0300141 | A1* | 10/2014 | Hihara et al. | 296/193.07 |
| 2015/0048652 | A1* | 2/2015 | Maeda et al. | 296/187.08 |

* cited by examiner

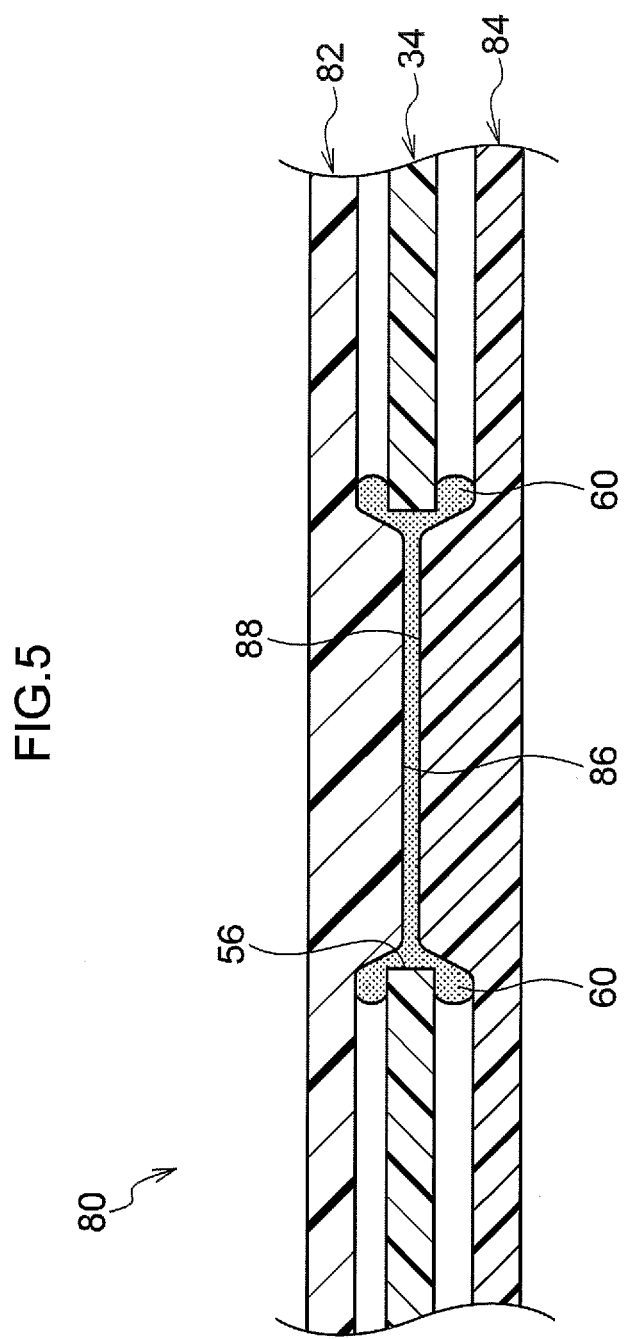

RESIN PANEL STRUCTURE

CROSS-REFERENCE TO RELATED APPLICATION

This application is based on and claims priority under 35 USC 119 from Japanese Patent Application No. 2013-267967 filed on Dec. 25, 2013, the disclosure of which is incorporated by reference herein.

BACKGROUND

Technical Field

The present invention relates to a resin panel structure formed using fiber reinforced plastic.

Related Art

Patent Document 1 (Japanese Patent Application Laid-Open (JP-A) No. 2013-216250) describes a vehicle cabin provided with a carbon fiber reinforced plastic (CFRP) upper panel and a CFRP lower panel as a resin panel structure formed using a fiber reinforced plastic. A joining flange is formed to both an outer peripheral portion of the upper panel and an outer peripheral portion of the lower panel, and the cabin is configured by superimposing and joining the joining flanges to each other. A resin panel structure in which a core panel is placed between an upper panel and a lower panel is also known.

However, in a resin panel structure in which plural resin panels are joined, although increasing the number of layered resin panels enables an increase in strength, it becomes difficult to secure positioning precision during joining. When the upper panel, a core panel, and the lower panel are joined together using the technology disclosed in Patent Document 1, it is difficult to precisely superimpose the joining flanges of the three resin panels, and there is a possibility of this leading to a reduction in the strength of the resin panel structure.

SUMMARY

In consideration of the above circumstances, an object of the present invention is to provide a resin panel structure capable of improving positioning precision of a resin panel.

A resin panel structure according to a first aspect of the invention includes a fiber reinforced plastic upper panel, a fiber reinforced plastic lower panel installed below the upper panel, a fiber reinforced plastic core panel that is installed between the upper panel and the lower panel and joined to the upper panel and the lower panel, and includes an opening into which a portion of the upper panel or a portion of the lower panel is inserted, and a joining member that joins the upper panel or the lower panel that is inserted into the opening, and the other of the upper panel or the lower panel, together.

In the resin panel structure according to the first aspect, the fiber reinforced plastic core panel is installed between the fiber reinforced plastic upper panel and the fiber reinforced plastic lower panel, and the core panel is joined to both the upper panel and lower panel. Namely, an upper face of the core panel is joined to the upper panel, and a lower face of the core panel is joined to the lower panel. The opening is provided to the core panel, and a portion of the upper panel or a portion of the lower panel is inserted into the opening. This enables the three resin panels that are the upper panel, the lower panel and the core panel to be positioned using the opening as a reference, and enables positioning precision to be improved.

Moreover, the upper panel or the lower panel that is inserted into the opening and the other of the upper panel or the lower panel are joined together by the joining member. This enables the strength of the resin panel structure to be improved compared to a configuration in which the upper panel and the lower panel are joined with the core panel interposed therebetween across the entire region of the join. Furthermore, when an external force acts on the resin panel structure, relative movement between the upper panel and the lower panel can be suppressed.

A resin panel structure according to a second aspect is the resin panel structure according to the first aspect, wherein plural beads running along one direction are provided to the core panel.

In the resin panel structure according to the second aspect, the closed cross-section surface area of the resin panel structure is increased by the plural beads, enabling strength to be improved. Note that "bead" referred to herein indicates a location formed in a ridge shape by press molding or the like.

A resin panel structure according to a third aspect is the resin panel structure according to the second aspect, wherein the opening is provided between adjacent beads.

In the resin panel structure according to the third aspect, when an external force acts on the resin panel structure, the external force is transmitted along the beads, thereby enabling the external force to be suppressed from concentrating at the opening. This enables a join portion of the upper panel and the lower panel to be suppressed from being damaged or separated.

A resin panel structure according to a fourth aspect is the resin panel structure according to any one of the first aspect to the third aspect, wherein an indented portion is provided to the upper panel such that the upper panel is indented toward the lower panel side and inserted into the opening, and a through hole is formed at a join portion where the indented portion and the lower panel are joined together so as to pierce through in the up-down direction.

In the resin panel structure according to the fourth aspect, in cases in which the resin panel structure is employed at a portion of a vehicle to which rainwater or the like adheres, for example, any liquid that has adhered to the resin panel structure can collect in the indented portion, and be externally discharged from the vehicle through the through hole.

A resin panel structure according to a fifth aspect is the resin panel structure according to the fourth aspect, wherein the join member is filled between the upper panel and the lower panel so as to span from the opening across to the through hole.

In the resin panel structure according to the fifth aspect, moisture or the like to be externally discharged from the vehicle through the through hole can be suppressed from entering between the panels.

As explained above, the resin panel structure of the invention has an excellent advantageous effect of enabling positioning precision of a resin panel to be improved.

BRIEF DESCRIPTION OF DRAWINGS

FIG. 5 is a cross-section of an indented portion configuring a resin panel structure according to a second modified example of an exemplary embodiment, cut along the vehicle width direction.

DETAILED DESCRIPTION

Detailed explanation follows regarding a resin panel structure according to an exemplary embodiment of the present invention, based on the drawings. Note that, in the below explanation, an exemplary embodiment in which a resin panel structure is applied to a stack frame supporting a fuel cell stack disposed at a lower side of a vehicle floor panel is described as an example; however the invention is not limited thereto, and the resin panel structure may be applied to a frame or the like employed for other purposes. Note that for ease of explanation, in each of the drawings the arrow UP indicates the vehicle body upward direction, the arrow FR indicates the vehicle body front direction, and the arrow RH indicates the vehicle body right direction as appropriate. Moreover, in the following explanation, in cases in which reference is made to the up-down, front-rear, or left-right directions alone, this may be understood to refer to up-down in the vehicle body up-down direction, front-rear in the vehicle body front-rear direction, and left and right in the vehicle body left-right direction (vehicle width direction).

Stack Frame Configuration

Figure 1:
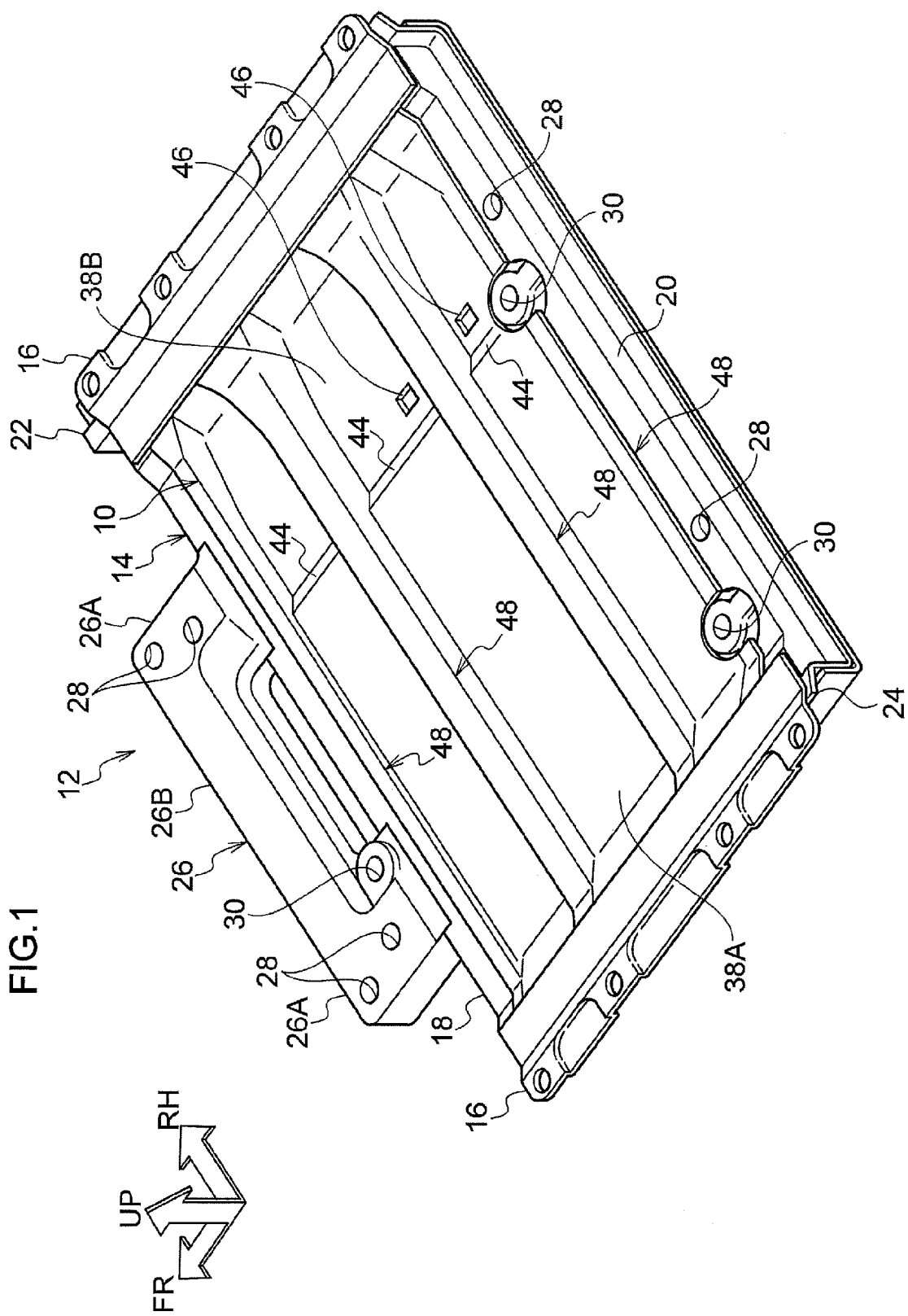
FIG. 1 is a perspective view illustrating a stack frame employing a resin panel structure according to an exemplary embodiment.

As illustrated in FIG. 1, a resin panel unit 10 employing a resin panel structure of the present exemplary embodiment configures a portion of a stack frame 12. The stack frame 12 is a frame disposed at a lower side of a floor panel of a vehicle such as an electric vehicle, and supports a fuel cell stack from the vehicle body lower side. The stack frame 12 is configured mainly including a frame shaped frame body 14, a pair of left and right upper portion ductile members 16, and the resin panel unit 10.

The frame body 14 is formed in a rectangular frame shape, and is provided with a front side long edge 18 and a rear side long edge 20 extending in the vehicle width direction, and a right side short edge 22 and a left side short edge 24 extending in the vehicle front-rear direction and coupling both vehicle width direction end portions of the front side long edge 18 and the rear side long edge 20 together. The frame body 14 is a metal member, and is formed of steel in the example in the present exemplary embodiment.

The front side long edge 18 configuring the frame body 14 is formed with a substantially hat shaped cross-section protruding upward, and a fastening tab 26 is provided at a vehicle width direction center portion of the front side long edge 18. The fastening tab 26 is formed with a flattened substantially U shaped profile, open to the vehicle rear side in plan view, and is provided with a pair of left and right extended portions 26A extending from the front side long edge 18 toward the vehicle front side, and a coupling portion 26B extending in the vehicle width direction and coupling the extended portions 26A together. The pair of extended portions 26A each has two bolt holes 28 formed thereto, in order to fasten the frame body 14 to the vehicle body. A bolt hole 30 for fastening the fuel cell stack is formed to a vehicle rear side end portion of the vehicle left side extended portion 26A.

The rear side long edge 20 is disposed further to the vehicle rear side than the front side long edge 18, and extends in the vehicle width direction parallel to the front side long edge 18. The rear side long edge 20 is also formed with a substantially hat shaped cross-section protruding upward, and bolt holes 30 for fastening the fuel cell stack are formed at locations at a vehicle left end portion of the rear side long edge 20, and slightly further to the right than a vehicle width direction center portion. The locations at which the bolt holes 30 are provided extend further toward the vehicle front side than the rear side long edge 20, and the bolt holes 30 are formed at vehicle front side end portions of the rear side long edge 20. Bolt holes 28 for fastening the frame body 14 to the vehicle body are formed at the vehicle right side of each of the bolt holes 30.

Figure 2:
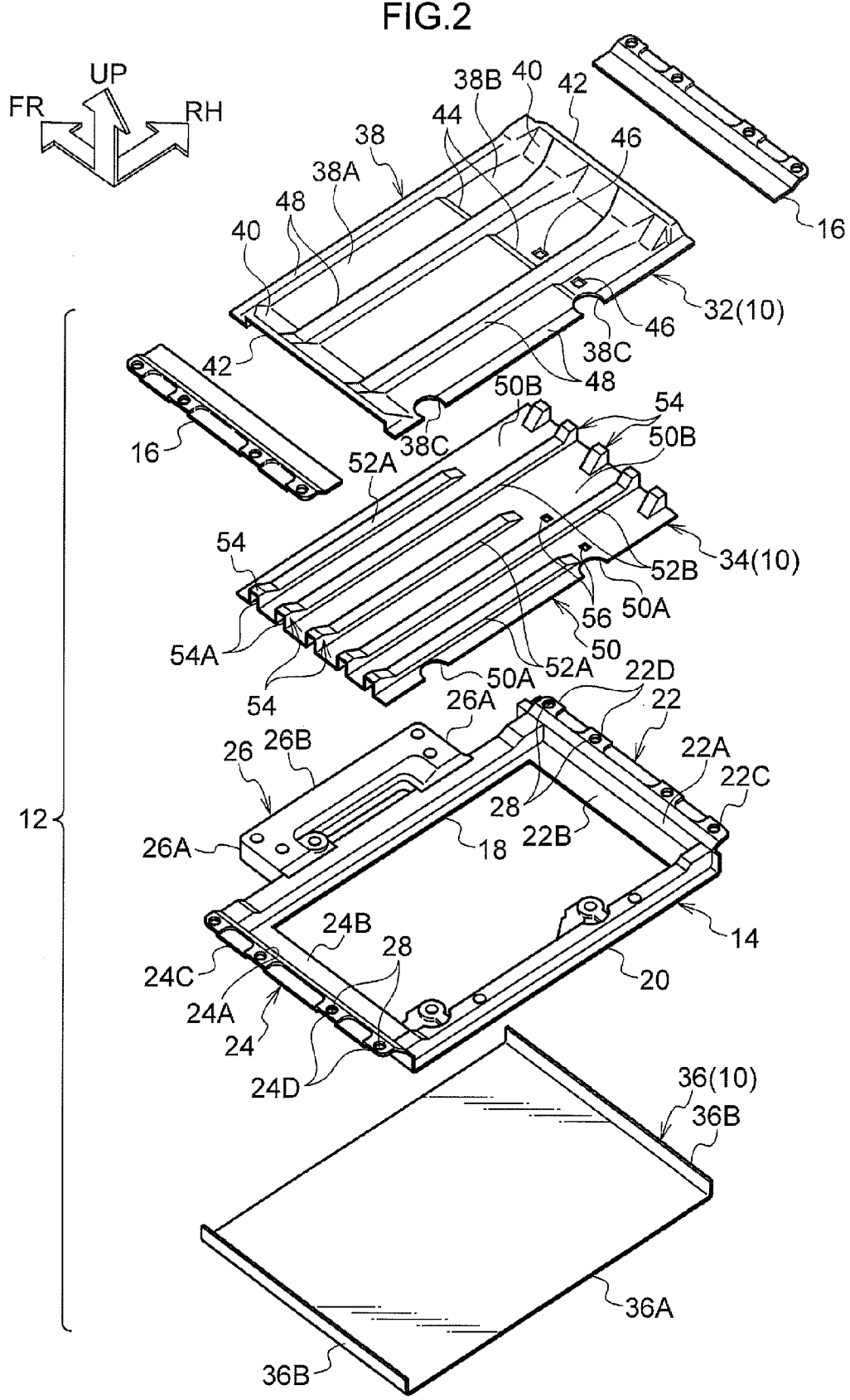
FIG. 2 is an exploded perspective view illustrating a stack frame employing a resin panel structure according to an exemplary embodiment.

A vehicle left end portion of the front side long edge 18, and a vehicle left end portion of the rear side long edge 20 are coupled together by the left side short edge 24. As illustrated in FIG. 2, the left side short edge 24 is formed with a left side vertical wall 24A extending up and down, a left side projection 24B projecting out from a lower end portion of the left side vertical wall 24A toward the vehicle width direction inside, and a left side flange 24C projecting out from an upper end portion of the left side vertical wall 24A toward the vehicle width direction outside (see FIG. 2).

Plural left side raised beads 24D extending in the vehicle width direction are provided to the left side flange 24C. The left side raised beads 24D are formed so as to protrude upward, and, as an example, four left side raised beads 24D are provided at intervals in the vehicle front-rear direction in the present exemplary embodiment. Bolt holes 28 for fastening the frame body 14 to the vehicle body are formed to the left side raised beads 24D.

A vehicle right end portion of the front side long edge 18, and a vehicle right end portion of the rear side long edge 20 are coupled together by the right side short edge 22. The right side short edge 22 is formed with a substantially similar shape to the left side short edge 24, and is provided with a right side vertical wall 22A extending up and down, a right side projection 22B projecting out from a lower end portion of the right side vertical wall 22A toward the vehicle width direction inside, and a right side flange 22C projecting out from an upper end portion of the right side vertical wall 22A toward the vehicle width direction outside. Plural right side raised beads 22D extending in the vehicle width direction are provided to the right side flange 22C, and bolt holes 28 for fixing the frame body 14 to the vehicle body are formed to the right side raised beads 22D.

As illustrated in FIG. 1, the resin panel unit 10 is attached to the frame body 14 configured as described above, and the upper portion ductile members 16 are joined from above to both vehicle width direction end portions of the resin panel unit 10. Each of the upper portion ductile members 16 is an elongated shaped metal member with its length direction along the vehicle front-rear direction, and a lower face of the upper portion ductile member 16 is joined by adhesive to an upper face of an upper panel 32 of the resin panel unit 10.

Resin Panel Unit 10 Configuration

Explanation follows regarding the resin panel unit 10 employed in the resin panel structure of the present invention. As illustrated in FIG. 2, the resin panel unit 10 is configured mainly including the upper panel 32, a core panel 34, and a lower panel 36. These panels are layered in the vehicle up-down direction, forming the resin panel unit 10.

The upper panel 32 is a FRP (fiber reinforced plastic) member, and is formed of CFRP (carbon fiber reinforced plastic) in the example in the present exemplary embodiment. Note that there is no limitation thereto, and the upper panel 32 may be formed of another fiber reinforced plastic, such as GFRP (glass fiber reinforced plastic) or DFRP (polyethylene fiber reinforced plastic). The same applies to the core panel 34 and the lower panel 36 described below.

A top section 38 that is substantially rectangular shaped in plan view is provided to the upper panel 32, and inclined portions 40 inclining upward toward the vehicle width direction outside are provided contiguously to both vehicle width direction end portions of the top section 38, so as to run along the shape of both vehicle width direction end portions of the core panel 34, described later. Substantially horizontal rectangular flat plate shaped flanges 42 are provided contiguously to vehicle width direction end portions of both inclined portions 40 and extending toward the vehicle width direction outside. Cutaway portions 38C are formed cutaway toward the vehicle front side at portions of a vehicle rear side end portion of the top section 38 so as avoid interference with the rear side long edge 20 configuring the frame body 14.

A stepped portion 44 is formed slightly to the right side of a vehicle width direction center portion of the top section 38. The stepped portion 44 extends in the vehicle front-rear direction, and the top section 38 is divided into a left side left top section 38A and a right side right top section 38B by the stepped portion 44. Since the stepped portion 44 inclines downward at an angle from the vehicle left side toward the vehicle right side, the left top section 38A is positioned higher than the right top section 38B. Plural indented portions 46 that are indented downward (toward the lower panel 36 side) are formed to the right top section 38, with two indented portions 46 formed as an example in the present exemplary embodiment. Details of the indented portions 46 are described later.

Plural raised beads 48 running along the vehicle width direction are formed to the top section 38, and four raised beads 48 are formed in the example in the present exemplary embodiment. Each of the raised beads 48 is formed so as to protrude upward, and extends in the vehicle width direction, running across the left top section 38A and the right top section 38B.

The carbon fiber reinforced plastic (CFRP) lower panel 36 is disposed below the upper panel 32. The lower panel 36 is positioned below the frame body 14, and is provided with a bottom section 36A that has a substantially rectangular flat plate shape in plan view, and side walls 36B that curve toward the vehicle upper side from both vehicle width direction end portions of the bottom section 36A so as to be substantially perpendicular thereto. The side walls 36B are each superimposed with the respective left side vertical wall 24A and the right side vertical wall 22A of the frame body 14, and joined together by adhesive or the like. Note that the join may be made by a joining member other than an adhesive, and the join may be made using nuts and bolts, for example. The join may also be made using rivets or the like, or a combination thereof may be used. Similarly, the joining together of plural components described below is not limited to adhesive, and various joining members may be used.

The carbon fiber reinforced plastic core panel 34 is placed between the upper panel 32 and the lower panel 36. The core panel 34 is formed slightly smaller than the frame body 14, and is configured so as to be contained within the frame of the frame body 14. The core panel 34 includes a core main section 50, at which plural rows of raised beads 52A and raised beads 52B, serving as beads with a substantially hat shaped cross-section extending along the vehicle width direction, are arrayed along the vehicle front-rear direction. Protruding portions 54, formed so as to protrude to the vehicle upper side, are provided to both vehicle width direction end portions of the core main section 50.

The core main section 50 is formed in a substantially rectangular shape in plan view, and cutaway portions 50A are formed toward the vehicle front side at portions of a vehicle rear side end portion thereof, so as avoid interference with the rear side long edge 20 configuring the frame body 14. The raised beads 52A positioned at both vehicle front-rear direction end portions and the raised bead 52A positioned at a vehicle front-rear direction center portion of the core main section 50 terminate within the core main section 50 at positions slightly further to the right side than a vehicle width direction center portion thereof. The shape of each of the terminal portions inclines so as to correspond to the shape of the stepped portion 44 formed to the top section 38 of the upper panel 32.

The raised beads 52B, provided between the three raised beads 52A that terminate within the core main section 50, extend from the vehicle left protruding portions 54 to the vehicle right protruding portions 54. A location further to the vehicle right than the terminal portions where the raised beads 52A terminate configures a flat face portion 50B formed with a substantially flat faced shape, except for at the two raised beads 52B.

Plural openings 56 are formed to the flat face portion 50B, with two openings 56 formed as an example in the present exemplary embodiment. Each of the openings 56 opens in a substantially rectangular shape in plan view, and the lower panel 36 is exposed through the openings 56. The openings 56 are formed between adjacent raised beads 52A and raised beads 52B, as viewed in the vehicle front-rear direction. Namely, the openings 56 are formed at positions that are not superimposed on a hypothetical line extending toward the vehicle left from the raised beads 52A terminating within the core main section 50. Note that, although in the present exemplary embodiment the shape of the openings 56 is formed as substantially rectangular shaped in plan view, the shape is not limited thereto, and the openings 56 may be formed in another shape, such as a substantially circular shape or a substantially elliptical shape in plan view, or a polygonal shape. Moreover, the shape and size of the openings 56 do not need to be uniform, and the openings 56 may be formed in different shapes and sizes.

The protruding portions 54 provided to both vehicle width direction end portions of the core main section 50 incline upward at an angle toward the vehicle width direction outside, and then extend substantially horizontally toward the vehicle width direction outside. A vehicle width direction outside end portion of each of the protruding portions 54 configures an end face portion 54A with a cross-section that is substantially perpendicular to the core main section 50. Namely, the protruding portions 54 are each formed as substantially trapezoidal shaped in face-on view viewed from the vehicle rear.

Note that, although three raised beads 52A and two raised beads 52B are formed to the core main section 50 in the example in the present exemplary embodiment, configuration is not limited thereto, and there is no particular limit to the number of raised beads 52A or the number of raised beads 52B.

Upper faces of the raised beads 52A and the raised beads 52B of the core panel 34 configured as above are joined by adhesive to a lower face of the top section 38 of the upper panel 32, and a lower face of the core main section 50 of the core panel 34 is joined by adhesive to an upper face of the bottom section 36A of the lower panel 36. This accordingly configures the resin panel unit 10 with a rectangular shaped cross-section structure.

Figure 3:
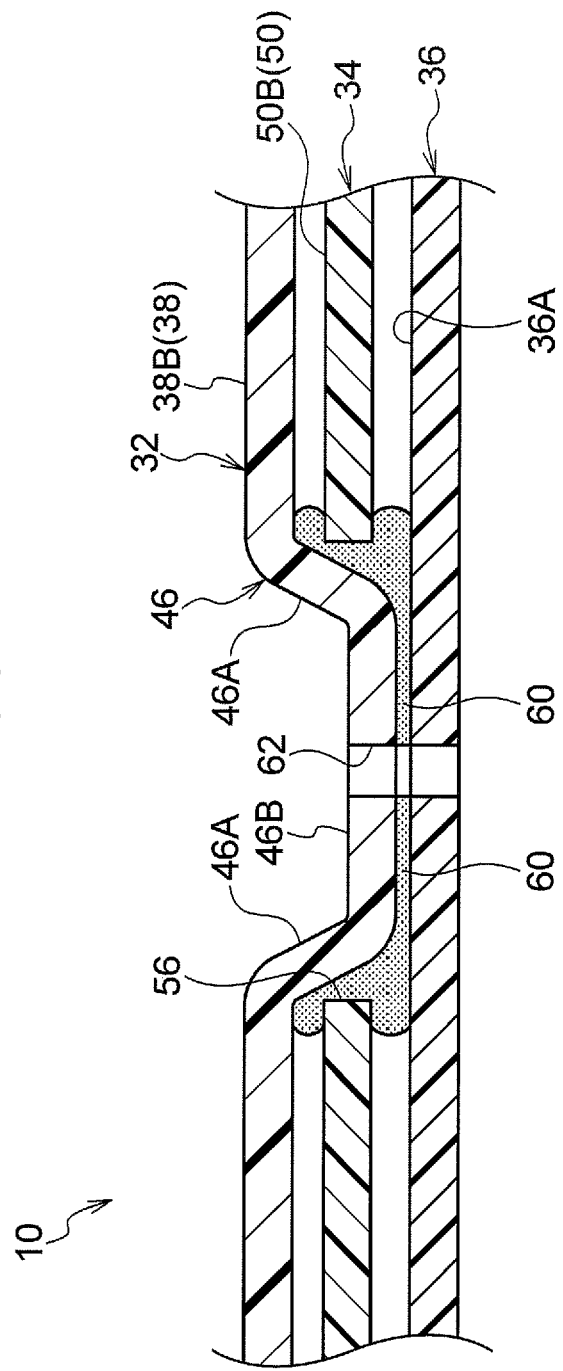
FIG. 3 is a cross-section of an indented portion configuring a resin panel structure according to an exemplary embodiment, cut along the vehicle width direction.

Explanation follows regarding the indented portions 46 formed to the right top section 38B of the upper panel 32. As illustrated in FIG. 1, the indented portions 46 are each formed in a substantially rectangular shape and are provided at the same positions as the openings 56 formed to the core panel 34 in plan view. As illustrated in FIG. 3, each of the indented portions 46 includes inclined walls 46A inclining downward at an angle from an upper face of the right top section 38B, and a rectangular flat plate shaped bottom wall 46B is contiguously provided to lower end portions of the inclined walls 46A.

The inclined walls 46A of the indented portions 46 are inserted into the respective openings 56 of the core panel 34, and the bottom walls 46B are disposed lower than the core panel 34. The bottom walls 46B are then joined to the upper face of the bottom section 36A of the lower panel 36 by an adhesive 60 serving as a joining member. The adhesive 60 is also present between the inclined walls 46A and the openings 56 of the core panel 34, and the upper panel 32, the core panel 34, and the lower panel 36 are joined together by the adhesive 60.

A through hole 62 passing through in the vehicle up-down direction is formed to the join portion at which the bottom wall 46B and the lower panel 36 are joined together. The through hole 62 is contiguously provided to the lower panel 36 and the upper panel 32 with a substantially similar bore.

Note that the through hole 62 does not need to be formed to all of the indented portions 46 provided to the upper panel 32, and it suffices to provide the through hole 62 to some of the indented portions 46. Moreover, although the indented portions 46 are only provided to the right top section 38B, and the upper panel 32 and the lower panel 36 are joined together in the present exemplary embodiment, configuration is not limited thereto, and similar indented portions may also be formed to the left top section 38A. In such cases, the openings 56 may be formed between the raised beads 52A and the raised beads 52B of the core panel 34, or may be formed to apex portions of the raised beads 52A or the raised beads 52B.

Although the shape of the indented portions 46 is substantially rectangular in the present exemplary embodiment, the shape is not limited thereto, and the shape may be substantially circular or substantially rectangular in plan view. Moreover, the size and shape of the plural indented portions 46 do not need to be uniform, and the indented portions 46 may each be formed with different sizes and shapes.

Although the adhesive 60 joining the bottom walls 46B of the indented portions 46 and the bottom section 36A of the lower panel 36, and the adhesive 60 joining the inclined walls 46A of the indented portions 46 and the openings 56 of the core panel 34 form a single unit in the present exemplary embodiment, configuration is not limited thereto, and adhesion may be performed separately. Moreover, the adhesive 60 may be provided just between the bottom walls 46B of the indented portions 46 and the bottom section 36A of the lower panel 36. Furthermore, the adhesive 60 may be filled into a gap between the upper panel 32 and the core panel 34, and into a gap between the core panel 34 and the lower panel 36, and joined.

Operation and Advantageous Effects

Explanation follows regarding operation and advantageous effects of the resin panel unit 10 of the present exemplary embodiment. In the resin panel unit 10 of the present exemplary embodiment, when superimposing the upper panel 32, the core panel 34 and the lower panel 36 on each other, it suffices to insert the indented portions 46 of the upper panel 32 into the openings 56 of the core panel 34, thereby improving positioning precision and enabling positioning to be easily performed.

Namely, when joining together the core panel 34 and the upper panel 32, for example, it is sufficient to pre-apply adhesive to the upper faces of the raised beads 52A and the raised beads 52B of the core main section 50 configuring the core panel 34, then to insert the indented portions 46 of the upper panel 32 into the respective openings 56 of the core panel 34, and press the lower face of the top section 38 of the upper panel 32 against the raised beads 52A and the raised beads 52B. This enables positioning to be performed with good precision, simply by inserting the indented portions 46 into the openings 56.

In the present exemplary embodiment, the shape of the openings 56 and the indented portions 46 is substantially rectangular in plan view, thereby enabling relative rotation of the upper panel 32 and the core panel 34 to be suppressed, even when only one indented portion 46 is formed to the upper panel 32. Providing plural indented portions to the upper panel 32, as in the present exemplary embodiment, enables positioning precision of the relative angle between the upper panel 32 and the upper panel 32 to be further increased.

As illustrated in FIG. 3, forming the through hole 62 to the lower panel 36 at the join portion with the upper panel 32 enables combined positioning of the through hole 62 and of the position of the upper panel 32 with the through hole 62. Note that, positioning of the upper panel 32 and the core panel 34 with the frame body 14 may be performed when the lower panel 36 is fixed to the frame body 14 in advance. This enables positioning of the upper panel 32, the core panel 34, and the lower panel 36 to be performed.

In the present exemplary embodiment, the upper panel 32 and the core panel 34 are joined together by adhesive, the core panel 34 and the lower panel 36 are joined together by adhesive, and the upper panel 32 and the lower panel 36 are joined together by the adhesive 60. This enables the join strength to be improved compared to a configuration in which the upper panel 32 and the lower panel 36 are joined together with the core panel 34 therebetween across the entire region of the join. In particular, as illustrated in FIG. 3, joining together the three panels that are the upper panel 32, the core panel 34, and the lower panel 36 at the inside of the openings 56 using the adhesive 60 enables load acting on the resin panel unit 10 to be effectively dispersed to the three panels, and enables strength to be improved.

Even when, for example, an external force acts on the resin panel unit 10, and the upper panel 32 and the lower panel 36 try to move relative to each other, the indented portions 46 of the upper panel 32 are inserted into the respective openings 56 of the core panel 34, the indented portions 46 engage with the rims of the openings 56, enabling relative movement to be suppressed. Namely, relative movement of each of the panels and a reduction in strength can be suppressed.

In the present exemplary embodiment, since plural raised beads 48 are provided to the top section 38 of the upper panel 32, and plural raised beads 52A and raised beads 52B are provide to the core main section 50 of the core panel 34, the cross-section area of the closed cross-section is increased, enabling the strength of the resin panel unit 10 to be increased.

Furthermore, since the openings 56 of the core panel 34 are provided between the adjacent raised beads 52A and raised beads 52B, localized load acting on the openings 56 can be suppressed. Namely, in the event of a vehicle installed with the stack frame 12 illustrated in FIG. 1 colliding with a pole or the like, causing load to act from the vehicle right, for example, since the majority of the load is transmitted along the raised beads 48 of the upper panel 32 and the raised beads 52A and raised beads 52B of the core panel 34, load is less liable to act on the openings 56 formed to the flat face portion 50B of the core main section 50. Suppressing localized load acting on the openings 56 in this way enables damage or separation of join portions of the upper panel 32 and the lower panel 36 to be suppressed.

When the resin panel unit 10 is employed as a portion of the stack frame 12, the resin panel unit 10 is disposed at the lower side of a vehicle lower panel, and liquid such as rainwater or condensation sometimes adheres to the resin panel unit 10. Since liquid such as water moves toward, and accumulates in, low positions, by forming the through holes 62 to the indented portions 46 of the upper panel 32 as in the present exemplary embodiment, the liquid can be collected in the indented portions 46 and externally discharged from the vehicle through the through holes 62. When this occurs, since the adhesive 60 has been filled from the openings 56 across to the through holes 62, ingress of the liquid between the upper panel 32 and the lower panel 36 can be suppressed.

A vehicle lower section structure according to an exemplary embodiment of the present invention is explained above; however, it goes without saying that various modifications may be implemented within a scope not departing from the spirit of the invention. For example, the indented portions 46 are provided to the upper panel 32, and the indented portions 46 are joined to the lower panel 36; however configuration is not limited thereto, and raised portions protruding to the vehicle upper side may be provided to the lower panel 36. In such a case, similar advantageous effects can be obtained by inserting the raised portions on the lower panel 36 into the openings 56 on the core panel 34, and joining the raised portions to the lower face of the upper panel 32.

Moreover, by inserting the indented portions 46 of the upper panel 32 into some of the openings 56 out of the plural openings 56 formed to the core panel 34, and inserting the raised portions of the lower panel 36 into the remaining openings 56, positioning can be performed simply and with good precision.

Figure 4:
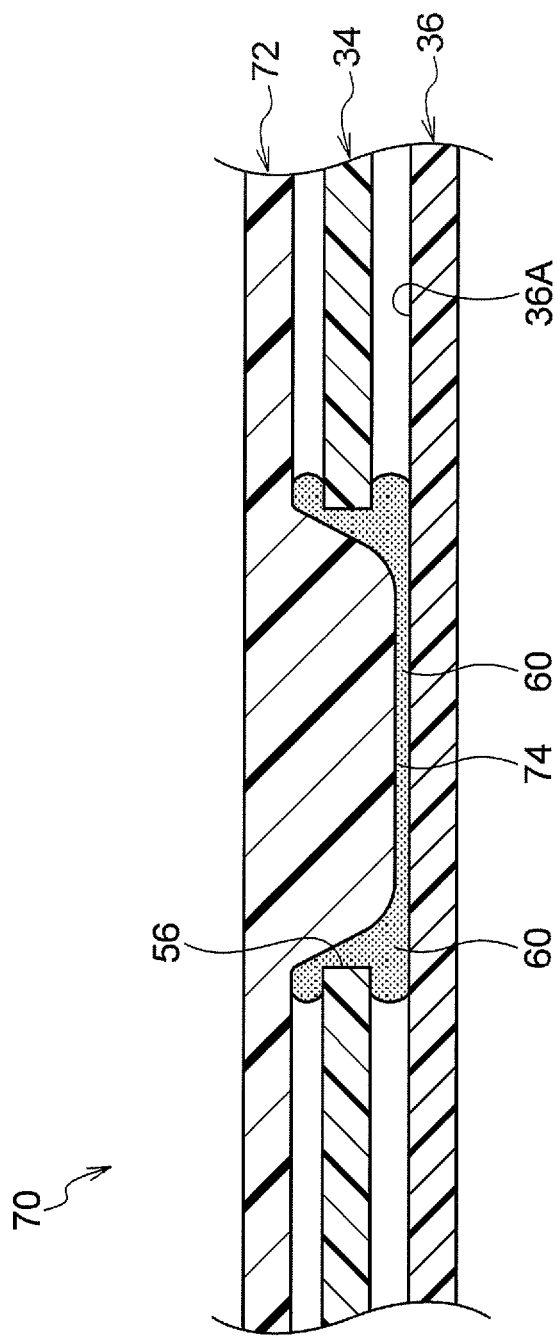
FIG. 4 is a cross-section of an indented portion configuring a resin panel structure according to a first modified example of an exemplary embodiment, cut along the vehicle width direction.

Furthermore, as in a resin panel unit 70 illustrated in FIG. 4, an upper panel 72 formed with a protruding portion 74 protruding downward may be employed, and the protruding portion 74 inserted into the opening 56. As in a resin panel unit 80 illustrated in FIG. 5, a configuration may be applied in which an upper panel 82 with a projection 86 projecting downward, and a lower panel 84 with a projection 88 projecting upward are prepared, and the projection 86 and the projection 88 are inserted into the opening 56 of the core panel 34 in a state facing each other.

In each of the configurations described above, joining the three panels using the adhesive 60 enables load acting on the resin panel unit to be effectively dispersed to the three panels, enabling strength to be improved. Note that, although in FIG. 4 and FIG. 5 no through hole is formed to the join portion, configuration is not limited thereto, and a similar through hole to that in FIG. 3 may be formed.

What is claimed is:

1. A resin panel structure comprising:
   a fiber reinforced plastic upper panel extending in a horizontal direction;
   a fiber reinforced plastic lower panel extending in the horizontal direction installed below the upper panel;
   a fiber reinforced plastic core panel extending in the horizontal direction that is installed between the upper panel and the lower panel and joined to the upper panel and the lower panel, and includes an opening through which a portion of the upper panel or a portion of the lower panel is inserted; and
   a joining member that joins together (i) the upper panel or the lower panel that is inserted into the opening and (ii) the other of the upper panel or the lower panel, wherein
   the joining member is a continuous joining member that joins the core panel, the upper panel, and the lower panel at the opening,
   the core panel, the upper panel, and the lower panel are each in contact with the continuous joining member,
   an indented portion is provided to the upper panel such that the upper panel is indented toward a side of the lower panel and inserted into the opening, the indented portion having a bottom wall that faces the side of the lower panel and an inclined wall that faces a side of the opening, and
   the joining member being a single continuous joining member that (i) contacts and joins the bottom wall of the indented portion with the lower panel and (ii) contacts and joins the inclined wall of the indented portion with the side of the opening of the core panel.

2. The resin panel structure of claim 1, wherein a plurality of beads running along one direction are provided to the fiber reinforced plastic core panel.

3. The resin panel structure of claim 2, wherein the opening is provided between adjacent beads of the plurality of beads.

4. The resin panel structure of claim 1, wherein:
   a through hole is formed at a join portion where the indented portion and the lower panel are joined together so as to pierce through in an up-down direction.

5. The resin panel structure of claim 2, wherein:
   a through hole is formed at a join portion where the indented portion and the lower panel are joined together so as to pierce through in an up-down direction.

6. The resin panel structure of claim 3, wherein:
   a through hole is formed at a join portion where the indented portion and the lower panel are joined together so as to pierce through in an up-down direction.

7. The resin panel structure of claim 4, wherein the joining member is filled between the upper panel and the lower panel so as to span from the opening across to the through hole.

8. The resin panel structure of claim 5, wherein the joining member is filled between the upper panel and the lower panel so as to span from the opening across to the through hole.

9. The resin panel structure of claim 6, wherein the joining member is filled between the upper panel and the lower panel so as to span from the opening across to the through hole.

10. The resin panel structure of claim 2, wherein:
the plurality of beads are disposed extending from a first end of the core panel toward a second end of the core panel;
a portion of the plurality of beads terminates within the core panel; and
the opening is formed at a flat face portion at a side of the second end of the core panel beyond a terminal portion at which the portion of the plurality of beads terminates.

11. The resin panel structure of claim 1, wherein the continuous joining member is disposed between an upper wall of the core panel and a lower wall of the upper panel and between a lower wall of the core panel and an upper wall of the lower panel.

12. The resin panel structure of claim 1, wherein the continuous joining member fills the opening between the fiber reinforced plastic core and the upper panel or the lower panel that is inserted into the opening.

13. A resin panel structure comprising:
a fiber reinforced plastic upper panel extending in a horizontal direction;
a fiber reinforced plastic lower panel extending in the horizontal direction installed below the upper panel;
a fiber reinforced plastic core panel extending in the horizontal direction that is installed between the upper panel and the lower panel and joined to the upper panel and the lower panel, and includes an opening through which a portion of the upper panel or a portion of the lower panel is inserted; and
a joining member that joins together (i) the upper panel or the lower panel that is inserted into the opening and (ii) the other of the upper panel or the lower panel, wherein
the joining member is a continuous joining member that joins the core panel, the upper panel, and the lower panel at the opening,
the core panel, the upper panel, and the lower panel are each in contact with the continuous joining member,
an indented portion is provided to the upper panel such that the upper panel is indented toward a side of the lower panel and inserted into the opening, the indented portion having a bottom wall that faces the side of the lower panel and an inclined wall that faces a side of the opening,
the joining member being a single continuous joining member that (i) joins the bottom wall of the indented portion with the lower panel and (ii) joins the inclined wall of the indented portion with the opening of the core panel, and
the continuous joining member is disposed between an upper wall of the core panel and a lower wall of the upper panel and between a lower wall of the core panel and an upper wall of the lower panel.

* * * * *